United States Patent [19]

Stauffer

[11] Patent Number: 4,767,922

[45] Date of Patent: Aug. 30, 1988

[54] HAND PRESENCE ACTIVATED WATER FAUCET CONTROLLER

[75] Inventor: Norman L. Stauffer, Englewood, Colo.

[73] Assignee: Honeywell Inc., Minneapolis, Minn.

[21] Appl. No.: 900,464

[22] Filed: Aug. 25, 1986

[51] Int. Cl.[4] .............................................. G01V 9/04
[52] U.S. Cl. ...................................... 250/221; 340/556
[58] Field of Search .................. 340/600, 556; 222/52; 250/221, 214 B

[56] References Cited

U.S. PATENT DOCUMENTS

| | | | |
|---|---|---|---|
| 3,480,787 | 11/1969 | Johansen | 250/221 |
| 3,576,277 | 4/1971 | Blackmon | 250/221 |
| 3,670,167 | 6/1972 | Forbes | 250/221 |
| 4,047,023 | 9/1977 | Key et al. | 250/214 B |

Primary Examiner—David C. Nelms
Assistant Examiner—Jessica Ruoff
Attorney, Agent, or Firm—Charles J. Ungemach

[57] ABSTRACT

An automatic faucet control including a radiation emitter directing radiation into the area of a sink where hands are to be washed and a detector positioned to receive radiation reflected from the hands to activate the water supply. The flow of water terminates when the hands are removed.

7 Claims, 1 Drawing Sheet

HAND PRESENCE ACTIVATED WATER FAUCET CONTROLLER

BACKGROUND OF THE INVENTION

In the interest of conserving water, it has been found desirable to provide water faucet control which will automatically turn on and off under desired conditions. For example, some restrooms provide water faucets which turn on automatically when a person approaches the sink and turn off when the person leaves. This is most often found in areas where public washing facilities are available to prevent the water from being left on when the party finishes washing, thus wasting water and possibly causing mess.

The prior art systems are usually ultrasonic systems which detect the presence or absence of an object in front of the sink so as to activate or deactivate the water supply. Such systems have the disadvantage that they respond, not to the presence of hands in the washing area, but rather to a person in front of the sink. Thus, the water will continue flowing so long as the person is in front of the sink as may be the case when the washing party does not leave the area of the sink immediately after washing or when some object is placed in the front of the sink inadvertently. Furthermore, the ultrasonic systems are costly, temperature sensitive and may be activated by ambient noise such as is found in noisy airports or factory environments.

SUMMARY OF THE INVENTION

The present invention overcomes the difficulties in the prior art by providing an optical device which produces a beam of radiation down into the area of the sink where hands are to be washed. Energy reflected from the hands is detected by a radiation sensor so as to activate a valve turning the water on. When the hands are removed from the sink, the energy is no longer reflected therefrom and the water is turned off. Radiation blocking means may be used in connection with the detector or the source so as to prevent radiation being reflected from the water stream itself and a modulated radiation emitter with a detector filter may be used to prevent ambient radiation from effecting the operation.

DETAILED DESCRIPTION OF THE PREFERRED EMBODIMENT

Figure 1:
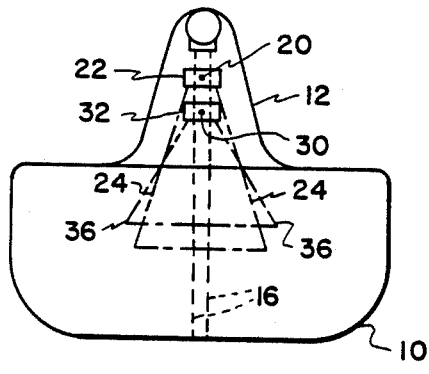
FIG. 1 shows a front view of sink and faucet with the emitter and detector of the present invention.
Figure 2:
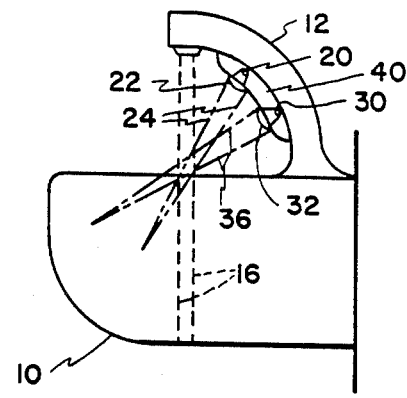
FIG. 2 shows a side view of FIG. 1.

In FIGS. 1 and 2 sink 10 a is shown having an upwardly extending faucet portion 12 bending thereover and operable to produce a stream of water such as shown by dash lines 16 down into the sink 10. In order to activate the flow of water when hands are placed in the area where the stream 16 would flow, a radiation emitting member 20, which may be a light emitting diode (LED) producing radiation in the infrared region at, for example, 830 to 920 nm, is shown mounted on the underside portion of the faucet 12. A lens 22, which is preferably a cylindrical lens, is placed in front of the LED 20 so as to direct a beam of radiation shown by dash dot lines 24, downward into the area of the sink where the hands would be placed when desired to be washed. When lens 22 is cylindrical, it will focus in a band or plane so that the hands can be in several locations in the area and still intercept the beam.

Also mounted on the underside portion of the faucet 12 is a radiation detector 30 which may be placed adjacent a lens 32 so as to receive radiation reflected from the hands when they are in the sink in the area of dash dot lines 24. Lens 32 may also be cylindrical so as to view a band or plane of radiation being reflected from the hands along lines such as shown by dash dot lines 36. In FIG. 2, emitter 20 and detector 30 as well as lenses 22 and 32 may be mounted in a suitable mounting arrangement 40 (not shown in FIG. 1 for clarity) which is shaped to fit the underside of faucet 12. The detector 30 and the emitter 20 may be reversed in the positions shown or may be mounted in other convenient locations but care should be exercised so that the beam of emitted radiation does not strike the sink itself in a position where energy would be reflected along the axis being viewed by the detector 30. Also, as will be shown more clearly in connection with FIGS. 3 and 4, the radiation being emitted by emitter 20 may be blocked in the central portion thereof so that the stream of water itself does not receive any radiation and thus would not reflect radiation to the detector 30 and prevent the flow from being terminated after the hands were removed. Alternately, the detector 30 could be blocked so that it did not view radiation from the area of the water stream itself for the same purpose.

Figure 3:
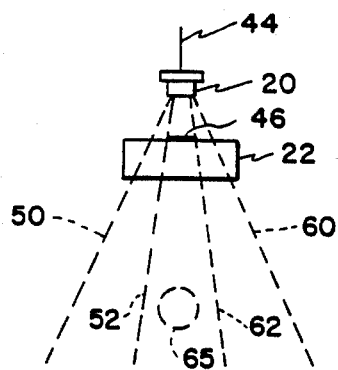
FIG. 3 shows a front view of the radiation detector or emitter.
Figure 4:
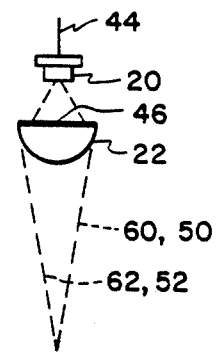
FIG. 4 shows a side view of FIG. 3.

FIG. 3 shows the light emitting diode 20 connected by electrical connection 44 so as to receive energy, as will be explained in connection with FIG. 5. Radiation being emitted from LED 20 travels down to the cylindrical lens 22 which, in FIG. 3, has an opaque member 46 mounted on the upper surface thereof. With opaque member 46 so mounted, radiation from LED 20 travels along lines such as shown by dash lines 50, 52, 60, and 62 into the area where the water stream shown by dash line 65 is lcoated. As is seen in FIG. 3, the blocking member 46 prevents radiation from striking the water stream 65 itself so that radation cannot be reflected therefrom when the are no hands in the area.

As mentioned in connection with FIGS. 1 and 2, the blocking member 46 could be placed on lens 32 so as to block radiation reflected from the water stream from reaching detector 30.

Figure 5:
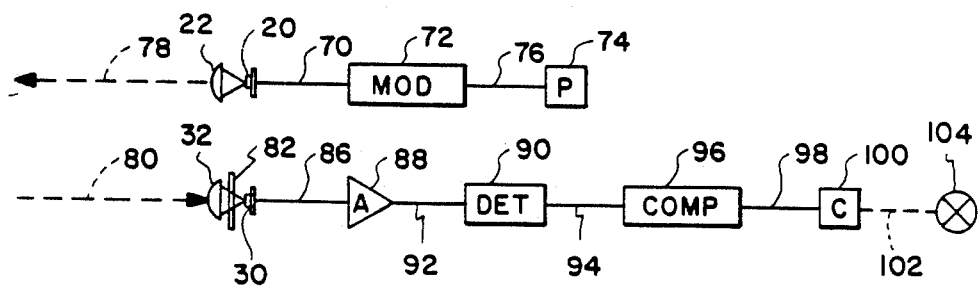
FIG. 5 is a schematic diagram of circuitry for use in controlling the water flow with the present invention.

Referring now to FIG. 5, the light emitter such as LED 20 is shown receiving energy over a connection 70 from a modulator 72 which is powered from a source of power 74 over a connection 76. Light emitting diode 20 will emit modulated radiation through lens 22 along a line shown as dash line 78 to the appropriate area of the sink. When hands are inserted below the faucet, reflected energy would be produced along lines such as shown by dash line 80 to be received by lens 32 and directed to the detector 30. FIG. 5 shows an optical filter 82 mounted between lens 32 and detector 30 which may be used to block much of the ambient radiation that might exist in the area from reaching detector 30. Since the reflected radiation is modulated, an electrical filter in the detection circuitry, described below, can be used to block most of any remaining ambient radiation that might get through. Signals received by detector 30 are transmitted over a connection 86 to an amplifier 88 whose output is connected to a detector 90 by a connection 92. Detector 90 will convert the pulsating signal to a DC signal at its output on connection 94 which is connected to a comparator 96. Comparator 96 will determine if the level of the signal on line 94 is sufficiently large to indicate that reflection from a significant object in the sink is being received and if so will produce an output signal on a connection 98 to a valve controller 100 connected, as shown, by dash line connection 102 to a valve 104. Valve controller 100 may take the form of solenoid operable when there is an output on line 98 to open valve 104 and thus permit the flow of water through faucet 12 into the sink.

When the hands are removed from the sink in the area of washing, there will no longer be any reflected energy along dash line 80 and the output of detector 30 will cease, thereby removing the signal to the controller 100 and thus causing valve 104 to close shutting off the flow of water.

As can be seen, I have provided a simple, inexpensive and effective faucet control for use in automatically turning water on and off by virtue of the presence of hands at a predetermined location in the sink. Many alterations to the apparatus shown in the preferred embodiment will occur to those skilled in the art and I do not intend to be limited by the specific disclosure used in connection therewith. I intend only to be limited by the following claims.

The embodiments of the invention in which an exclusive property or right is claimed are defined as follows:

1. Apparatus for detecting the presence of hands at a predetermined location in a sink so as to activate a water supply and to deactivate the water supply upon removal of the hands comprising:
   a source of radiation;
   cylindrical lens means directing radiation from the source to produce a band of radiation proximate to the predetermined location in the sink such that in the presence of hands at the predetermined location, radiation is reflected from the hands along a first axis but upon the removal of hands from the predetermined location the reflection of radiation along the first axis ceases; and
   control means positioned along the first axis to detect reflected radiation and operable in accordance therewith to produce a control signal to activate and deactivate the water supply.

2. Apparatus according to claim 1 wherein the control means includes radiation detecting means for viewing the predetermined location.

3. Apparatus according to claim 2 further including opaque means mounted along the first axis to block a portion of the radiation reflected to prevent the detecting means from receiving radiation reflected from any stream of water flowing into the sink.

4. Apparatus according to claim 1 further including means modulating the energy source and filter means connected to the control means to minimize ambient radiation in the control means.

5. Apparatus according to claim 1 wherein the control means includes radiation detecting means operable to produce an output upon receipt of radiation.

6. Apparatus according to claim 3 wherein the control means further includes a rectifier connected to the radiation detecting means to rectify the output and a comparator connected to the rectifier to compare the signal to a predetermined signal to produce the control signal.

7. Apparatus according to claim 1 further including opaque means mounted between the source and the lens means to block a portion of the radiation to prevent radiation from being reflected from any stream of water flowing into the sink.

* * * * *